US008855197B2

(12) United States Patent
Fisher et al.

(10) Patent No.: US 8,855,197 B2
(45) Date of Patent: Oct. 7, 2014

(54) METHOD AND APPARATUS FOR ALIGNING IDR FRAMES IN TRANSCODED MULTI-BITRATE VIDEO STREAMS

(75) Inventors: Yuval Fisher, Palo Alto, CA (US); Hain-Ching Liu, Fremont, CA (US); Dan R. Hunt, Nevada City, CA (US); Shankar Venkataraman, Cupertino, CA (US); Hsiang-Yun Alex Huang, Milpitas, CA (US)

(73) Assignee: RGB Networks, Inc., Sunnyvale, CA (US)

( * ) Notice: Subject to any disclaimer, the term of this patent is extended or adjusted under 35 U.S.C. 154(b) by 454 days.

(21) Appl. No.: 13/209,490

(22) Filed: Aug. 15, 2011

(65) Prior Publication Data
US 2013/0044803 A1   Feb. 21, 2013

(51) Int. Cl.
H04N 7/12       (2006.01)
H04N 21/845     (2011.01)
H04N 21/24      (2011.01)
H04N 21/61      (2011.01)
H04N 21/242     (2011.01)
H04N 21/2343    (2011.01)

(52) U.S. Cl.
CPC ....... *H04N 21/2343* (2013.01); *H04N 21/8455* (2013.01); *H04N 21/2402* (2013.01); *H04N 21/8456* (2013.01); *H04N 21/6125* (2013.01); *H04N 21/242* (2013.01)
USPC ............. 375/240.02; 375/240.13; 375/240.28

(58) Field of Classification Search
USPC .............. 375/240.02, 240.13, 240.26, 240.28
See application file for complete search history.

(56) References Cited

U.S. PATENT DOCUMENTS

| 6,002,687 | A  | * | 12/1999 | Magee et al. ................. 370/394 |
| 2003/0043924 | A1 | * | 3/2003  | Haddad et al. ........... 375/240.28 |
| 2003/0169813 | A1 |   | 9/2003  | Van Der Schaar |
| 2010/0312828 | A1 | * | 12/2010 | Besserglick et al. .......... 709/203 |
| 2011/0235991 | A1 | * | 9/2011  | Luthra et al. ................. 386/232 |
| 2013/0016781 | A1 | * | 1/2013  | Syed ....................... 375/240.13 |

FOREIGN PATENT DOCUMENTS

EP          1791346 A1 *  5/2007

\* cited by examiner

*Primary Examiner* — Jorge L Ortiz Criado
*Assistant Examiner* — Benjamin Pezzner
(74) *Attorney, Agent, or Firm* — Lipsitz & McAllister, LLC

(57) ABSTRACT

A video stream is transcoded to provide a plurality of primary profiles. Individual frames of the video stream have a Presentation Time Stamp (PTS). A PTS is used as a token to identify particular frames to be encoded as Instantaneous Decoder Refresh (IDR) frames in each profile. An IDR frame period is determined, indicative of a desired number of video frames between two IDR frames. An IDR frame is inserted into each profile every IDR frame period. The IDR frames of each profile are aligned with the same IDR frames of the other profiles. The PTS of each IDR frame in each profile is monitored. Upon determining that a PTS is out of alignment, the next PTS of the affected profile is aligned with the corresponding PTS of remaining profiles. Backup transcoders produce backup profiles that are maintained in alignment with each other and with the primary profiles.

12 Claims, 2 Drawing Sheets

METHOD AND APPARATUS FOR ALIGNING IDR FRAMES IN TRANSCODED MULTI-BITRATE VIDEO STREAMS

The present invention relates to the creation of transcoder output suitable for multi-bitrate adaptive Hyper-Text Transfer Protocol (HTTP) streaming. More particularly, the invention enables video output to be created from multiple encoding processes that is suitable for adaptive HTTP streaming. Such video requires multiple streams that have Instantaneous Decoder Refresh (IDR) frames at the same frame in their output. The present invention provides apparatus and methods for inserting IDR frames at the same place for all the different multiple encoding processes, and also provides suitable error recovery techniques.

BACKGROUND OF THE INVENTION

The explosion of streaming video on Internet Protocol (IP) networks has led to the development of so-called Adaptive HTTP Streaming protocols for video. While various different implementations of these protocols exist, they share certain features. In particular, a video stream is broken into short, several-second-long files which are downloaded by a client and played sequentially to form a seamless video view. The files or 'chunks' may be encoded at different bitrates and resolutions (referred to as "profiles"). A playlist file is used to let the client know the various available profiles, so that it can select which chunks to download based on local conditions, such as the available download bandwidth. In a typical scenario, the client may start downloading chunks at low resolution and low bandwidth and then switch to downloading chunks from higher bandwidth profiles, giving the user a fast tune-in with subsequently improved video quality.

In order to play back the chunks seamlessly (that is, without any video artifacts caused by errors at the chunk boundaries), it is convenient to have each chunk start with an IDR (Instantaneous Decoder Refresh) frame. IDR frames are special video frames that are encoded to be decodable independently of preceding video frames, and thus a chunk that starts with an IDR frame can be played back irrespective of what chunks were downloaded and decoded before.

In order for the client to be able to play back chunks from all of the available profiles, the following criteria should be satisfied:

Every chunk in a particular profile must have an identifiable, corresponding chunk in each of the other available profiles Each chunk must start with an IDR frame Optionally:

The chunks from each profile can be of equal duration

The chunks can each have the same presentation time stamp (PTS)

The scheme must also be robust enough to recover from all error conditions. It is noted that there may be other conditions on the chunks, such as those involving audio, which are not pertinent to the present invention.

The live video transcoding chain involves ingest of an encoded video bit stream, a video transcoder, and output of multiple video profiles encoded at different bitrates and resolutions. The input video streams ingested by the transcoder are already encoded. These are often streams delivered by satellite (or other means) to service providers that subsequently re-encode the video for various reasons, for example, in order to change the encoding format, resolution, or bitrate. The output of the transcoder may then be further processed by a Segmenter (sometimes called a Packager or a Fragmenter) that breaks the output profiles into chunks and makes them available for delivery to multiple clients over HTTP.

In order to guarantee continuity of service in the case of a transcoder failure, it is common to run multiple transcoders, often from different physical locations. In the case of Adaptive HTTP Streaming, it is desirable that the chunks generated from both the primary and back-up transcoder be IDR aligned. In that case, failure of the primary transcoder will result in delivery of chunks created from the back-up transcoder. If these are exactly aligned with the chunks in the primary transcoder, the client experience will remain smooth.

The present invention provides a methodology for enabling transcoders to create IDR aligned output profiles suitable for segmenting and adaptive delivery. It also ensures that different transcoders which ingest the same input will have all their outputs be IDR aligned, so that primary and back-up transcoders can create chunks that are aligned and compatible with each other.

In the past, the creation of video output suitable for adaptive HTTP streaming from multiple encoding processes has used messaging between the encoding processes. This type of messaging has the advantage that it works for encoders as well as transcoders (that is, it works when the input is in "baseband"). However, such messaging implementations are very complicated, costly and inefficient.

It would be advantageous to provide methods and apparatus that enable the creation of video output suitable for adaptive HTTP streaming from multiple encoding processes without the need for messaging between different encoding processes. It would be further advantageous to provide such a system that works for the transcoding case, where the input is ingested in a compressed format and transcoded into a different compressed format. Still further, it would be advantageous to enable the system to provide an arbitrary number of encoding processes with synchronized output. It would also be advantageous to provide the ability to have encoders at separate locations with synchronized output.

The present invention provides methods and apparatus having the aforementioned and other advantages. Moreover, the unique combination of components/techniques disclosed herein provides various improvements over previously known structures and techniques.

SUMMARY OF THE INVENTION

A method is provided for streaming video in a plurality of different profiles. A video stream is transcoded to provide the plurality of different profiles. The video stream comprises frames having a Presentation Time Stamp (PTS) which is used as a token to identify particular frames of the video stream to be encoded as Instantaneous Decoder Refresh (IDR) frames in each profile. An IDR frame period indicative of a desired number of video frames between two IDR frames is determined. An IDR frame is inserted into each profile of the video stream every IDR frame period. The IDR frames of each profile are aligned with the same IDR frames of the other profiles in the plurality of different profiles. The PTS of each IDR frame in each profile is monitored. If the monitoring step determines that a PTS is out of alignment, the next PTS of the affected profile is realigned with the corresponding PTS of remaining profiles.

One or more backup transcoders can be provided to duplicate the transcoding of the video stream into backup profiles. In such an embodiment, the monitoring and realigning steps are applied independently to each of the transcoders processing said video stream to maintain the profiles provided by the different transcoders (e.g., the primary transcoder and the backup transcoder(s)) in alignment with each other.

The method can include the steps of identifying a first frame of the video stream for transcoding, obtaining the PTS of the first frame, determining a time stamp threshold for commencing the transcoding process, and commencing transcoding in accordance with the determined time stamp threshold. If an IDR frame is inserted into the video stream based on one or more external triggers (e.g., an ad insertion cue) during the transcoding process, the insertion of subsequent IDR frames can be adjusted to maintain PTS alignment among the plurality of profiles.

Apparatus is provided for streaming video in a plurality of different profiles. A primary transcoder is coupled to receive an input video stream and transcode the stream to provide a first profile. The video stream includes frames having a Presentation Time Stamp (PTS). The primary transcoder includes a video decoder, a video encoder, a PTS detector, a global IDR frame calculator, an IDR insertion commander, an IDR PTS detector and a global IDR frame comparator. The video decoder decodes the input video stream and provides an uncompressed video stream. The video encoder receives the uncompressed video stream. The PTS detector is operatively associated with the video decoder for detecting the PTS in the frames. The global IDR frame calculator is operatively associated with the PTS detector for identifying a first frame of the video stream to be encoded as an IDR frame. The IDR insertion commander is responsive to the global IDR frame calculator for instructing the video encoder to encode a frame of the uncompressed video stream as an IDR frame. The IDR PTS detector obtains the PTS of IDR frames encoded by the video encoder. The global IDR frame comparator is responsive to the PTSs obtained by the IDR PTS detector for determining if a profile alignment error exists in one of the IDR frames. The IDR insertion commander is responsive to the global IDR frame comparator for instructing the video encoder to encode a following frame of the uncompressed video stream as an IDR frame in order to correct an alignment error.

A backup transcoder can be coupled to receive the input video stream and duplicate the transcoding of the video stream into backup profiles. The backup transcoder is adapted to insert an IDR frame into each backup profile of the video stream every IDR frame period. The IDR frames of each backup profile are aligned with the same IDR frames of the other backup profiles as well as the profiles provided by said primary transcoder. Since each profile operates independently, the operation of the primary and backup transcoders is exactly the same (or at least functionally equivalent).

A plurality of backup transcoders can be provided. In such an embodiment, the profiles provided by each of the primary and plurality of backup transcoders are maintained in alignment.

A primary segmenter can be associated with the primary transcoder for packaging the plurality of profiles into chunks. A backup segmenter can be associated with each backup transcoder for packaging the backup profiles into chunks. At least one server can be provided for streaming the chunks to a plurality of clients.

DETAILED DESCRIPTION OF THE INVENTION

As indicated above, the present invention provides a methodology that allows transcoders to create IDR aligned output profiles suitable for segmenting and adaptive delivery. It also ensures that different transcoders that ingest the same input will have all their outputs be IDR aligned, so that primary and back-up transcoders can create chunks that are aligned and compatible with each other.

Figure 1:
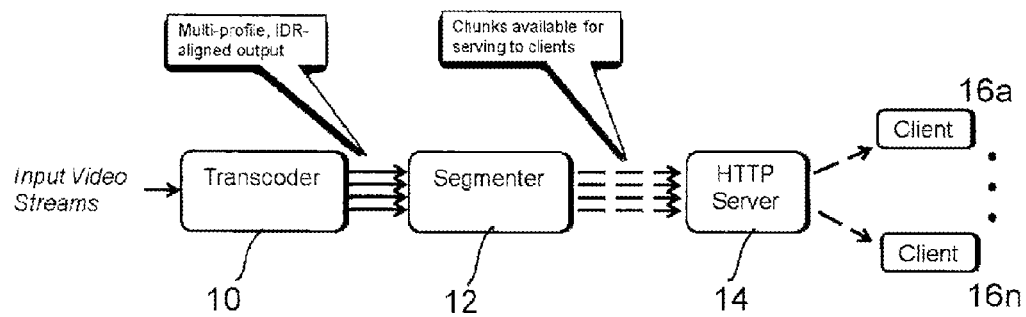
FIG. 1 is a block diagram illustrating apparatus for transcoding, segmenting and serving input video streams to clients.

FIG. 1 illustrates apparatus in which input video streams are provided to a transcoder 10. The transcoder processes the streams, and provides them as transcoded multi-profile IDR aligned output to a segmenter 12. The segmenter provides chunks to an HTTP server 14. The chunks are then available for serving to a plurality of clients 16a . . . 16n. The clients can comprise, for example, users who desire to view the video on a personal computer, tablet, smartphone, or the like.

Figure 2:
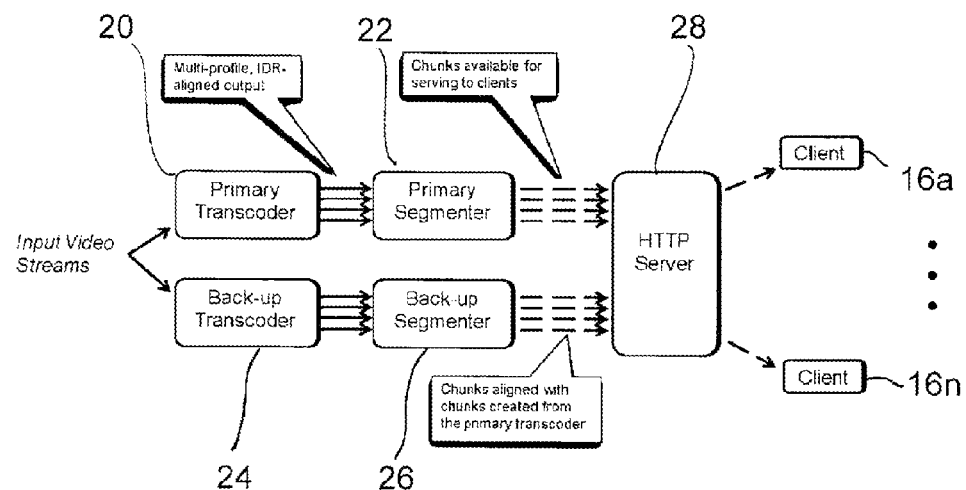
FIG. 2 is a block diagram illustrating apparatus as in FIG. 1 with a backup transcoder and backup segmenter for providing backup input video streams to clients.

In order to survive a failure of the transcoder 10 or the segmenter 12, one or more backup transcoders and segmenters can be provided. Such an implementation is illustrated in FIG. 2, where a primary transcoder 20 provides a primary segmenter 22 with multi-profile IDR-aligned output. The primary segmenter provides chunks, available for serving to clients, to an HTTP server 28. The server, in turn, can provide the chunks to one or more clients 16a . . . 16n. A back-up transcoder 24 and backup segmenter 26 are provided to backup the functions of primary transcoder 20 and primary segmenter 22, respectively. Any number of backup transcoders and segmenters can be provided. These backup devices provide chunks aligned with corresponding chunks provided by the primary transcoder.

Video streams conforming to the Motion Picture Experts Group (MPEG) standard contain Presentation Time Stamps (PTS) for the video, audio and data portions of the stream. The PTS is used to achieve synchronization of the separate elementary streams of a program (for example video, audio, subtitles) when presented to the viewer. The PTS is given in units related to a program's overall clock reference, either Program Clock Reference (PCR) or System Clock Reference (SCR), which is also transmitted in the transport stream or program stream.

In accordance with the present invention, the PTS included in an ingested stream is used as a token to identify which frames should be encoded as IDR frames. Since each instance of the transcoder has access to the PTS, every instance of the transcoder that utilizes the same algorithm will select the same frames as frames that should be encoded as IDR frames. This applies both to distinct output profiles of the same transcoder or output profiles of distinct transcoders. The system of the invention can be broken down into three parts as set forth below.

Step 1: First a selection is made of the first frame to encode. Typically, HTTP smooth streaming uses a 29.97 (or 25 for PAL) progressive frame rate whereas the broadcast content uses either interlaced 59.94 (or 50 for PAL) fields per second or progressive 59.94 (or 50 for PAL) frames per second. As a result, the selection of the first encoding frame is critical for the conversion from 59.94 (or 50 for PAL) interlaced fields per second or 59.94 (or 50 for PAL) progressive frames rate to 29.97 (or 25 for PAL) progressive frame rate, To do so, the decoding process is as follows:

1. For an H.264 input stream, search the Sequence Parameter Set (SPS) and its corresponding intra frame or IDR frame. For an MPEG-2 input stream, search the Sequence Start Code and its corresponding intra frame. Once the frame is identified, the decoding process is started.

2. Obtain the presentation time stamp of the first intra/IDR frame, and determine the time stamp threshold to start the encoder, as follows:
   a. Define ticksPerOutputFrame to be twice as large as ticksPerInputFrame or ticksPerInputField, depending on whether the input is progressive or interlaced, respectively.
   b. Assume that encoder needs at least nFrames (e.g., where n=4) to execute the command properly.
   c. Define firstPresentationTimeStamp as the timestamp of the first input frame or field.
   d. Calculate: desiredFirstTS=floor((firstPresentationTimeStamp+nFrames*ticksPerOutputFrame)/ticksPerOutputFrame)*ticksPerOutputFrame;
   e. Instruct encoder to start at time stamp desiredFirstTS. In a preferred embodiment, the "desiredFirstPTS" parameter is implemented as a threshold for the decoder to trigger the encoder to start. Since the input timestamp may fluctuate, it would be advantageous to deduct a small offset to compensate for any such fluctuation.

The above process implies a consistent frame selection process for the conversion between 59.94 (or 50 for PAL) and 29.97 (or 25 for PAL). After the above process, all output streams in the same profile will select the correct frame/field to encode. Thus, out-of-phase frame selection can be avoided.

In the case of input interlaced video with 59.94 (or 50 for PAL) fields, some encoders specify the top field as the base to convert into frame output. As a result, for those encoders, the above process can be avoided since the output streams in the same profile shall be in phase all the time.

Step 2: The next step in the process is to calculate the IDR period. Based on the desired number of video frames between two IDR frames (idrinterval), a desired IDR frame period (idrInterval90k), is selected. This is specified as an integer number of 90 KHz clock ticks, the clock base of the presentation time stamp. When starting the encoding process, the encoder is instructed to insert an IDR frame every idrInterval90k clock ticks.

The present invention uses the PTS as the reference source and rounds down by the idrInterval90k to its nearest next global time stamp (in 90 KHz ticks) expected for an IDR frame. This time stamp value is then used to instruct the encoder to insert an IDR frame. Since the encoder will insert an IDR frame every idrInterval frames, once a correct IDR is inserted, the encoder will generate a stream with IDR frames that are synchronized with other encoded streams using the same ingested stream and the same IDR insertion parameters. More specifically, the following process is used to align IDR frames across multiple transcoded streams from the same coding source:
   a. Obtain PTS of the first IDR frame, ptsFirstIDR. This should correspond to desiredFirstTS provided above.
   b. Let targetPTSNextIDR=ptsFirstIDR+idrInterval90k;
   c. Let initRemainder=targetPTSNextIDR−floor(targetPTSNextIDR/idrInterval90k)*idrInterval90k;
   d. Let targetPTSNextIDR=floor(targetPTSNextIDR/idrInterval90k);
   e. Let targetPTSNextIDR=(targetPTSNextIDR+1)*idrInterval90k;
   f. Instruct encoder to insert IDR at frame with PTS equal or larger than targetPTSNextIDR.

After step e, all output streams from the same input shall contain IDR frames periodically at a same defined position in the output stream.

Step 3: At this point in the process, the IDR period is monitored. As will be appreciated from "Step 2" (f) above, once the encoding output is locked into an IDR insertion period, all output streams shall generate IDR frames at same period as video frames unless errors are introduced at the input. In such scenarios, the transcoder either repeats the previous frame or skips the frame and jumps to the next one. Since input errors can be localized to one specific encoder only, the error recovery process does not run at all transcoders belonging to the same profile. As a result of the error processing, the specific transcoder may drift away from the locked IDR period. In order to correct this process, the transcoder shall closely monitor the PTS of every IDR frame and make sure that it is locked properly. More specifically, the following process is used for monitoring the IDR period:
   a. Suppose that the PTS from the current IDR is ptsIDR and that targetPTSNextIDR is set to the time stamp of the next desired IDR frame.
   b. Let curRemainder=ptsIDR−targetPTSNextIDR;
   c. If (abs(curRemainder−initRemainder)>MAX_ALLOWED_DEV), recommence the process at Step 2 (d) (continuing through Step 2 (f) to insert an IDR at the expected frame.

If other IDR frames are inserted (e.g., in response to external triggers such as ad insertion cues), Step 2 (d) to (f) shall be executed so that the next IDR frame can be inserted at the expected frame location.

Figure 3:
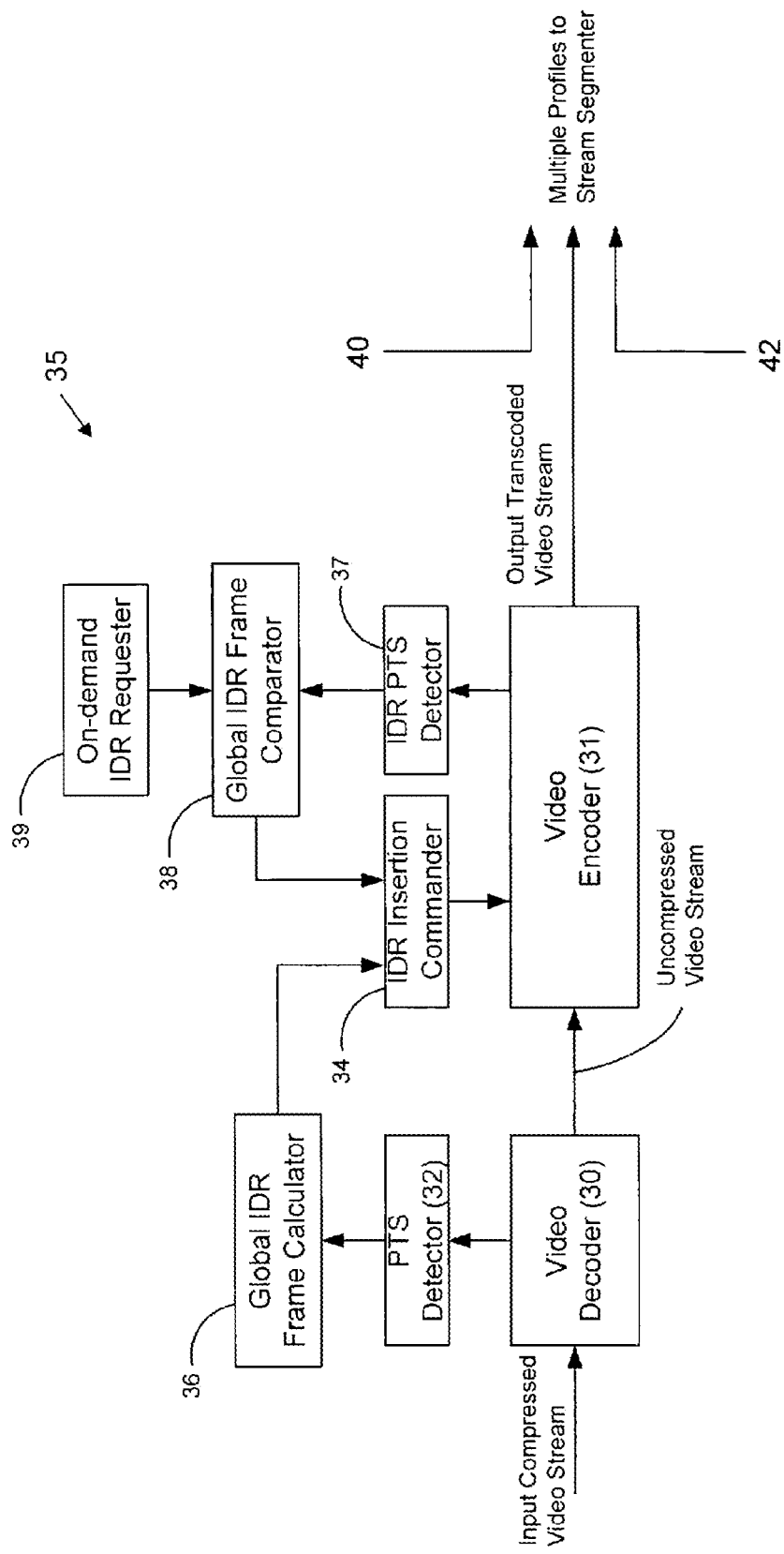
FIG. 3 is a block diagram of a transcoder with associated apparatus in accordance with the invention.

FIG. 3 is a block diagram of one possible embodiment of transcoder apparatus, generally designated 35, in accordance with the present invention. It should be appreciated that other embodiments are possible and will be apparent to those skilled in the art.

As shown in FIG. 3, a video decoder 30 is provided to receive a compressed input video stream and decode the stream to provide an uncompressed video stream to a video encoder 31. A presentation time stamp (PTS) detector 32 obtains the PTS values extracted from the input video stream by the video decoder 30 and forwards them to a Global Instantaneous Decoder Refresh (IDR) Frame Calculator 36. Calculator 36 makes a selection of the first frame to encode using, for example, the procedure set forth in "Step 1" above. The output of the Global IDR Frame Calculator 36 is the desiredFirstPTS. This value is provided to an IDR Insertion Commander 34, which instructs the video encoder 31 to encode a frame as an IDR frame at the desiredFirst PTS. After Global IDR Frame Calculator 36 determines the desiredFirstPTS for a video stream, it will not be used again until a new stream is presented to the video decoder 30. Subsequent IDR insertion commands for the video stream will be initiated by a Global IDR Frame Comparator 38 as described below.

An IDR PTS Detector 37 obtains the PTS of the first IDR frame (ptsFirstIDR) from the video encoder, as set forth in "Step 2" above. This PTS is forwarded to the Global IDR Frame Comparator 38, which performs steps (b) to (f) of Step 2. At step (f), the Global IDR Frame Comparator sends a new IDR command to the IDR Insertion Commander 34 to initiate a new IDR insertion.

The IDR PTS Detector 37 and Global IDR Frame Comparator 38 also execute the procedures set forth in "Step 3" above to monitor the IDR period and determine if the PTS from IDR is present when expected. If not, the Global IDR Frame Comparator 38 will send an IDR command to the IDR Insertion Commander 34 to insert the IDR at a specified frame.

An On-demand IDR Requester 39 is provided to insert other IDR frames, e.g., in response to external triggers such as ad insertion cues. The insertion process starts by sending an IDR command with the specific cue time. Then, the logic executes Step 2 (d) to (f) so that the next IDR frame can be inserted at the expected frame location for global IDR alignment.

The output of video encoder 31 comprises the transcoded video stream. As illustrated in FIG. 3, multiple profiles are provided, each being processed by a functionally identical transcoder such as transcoder 35. For purposes of explanation, transcoder 35 shown in FIG. 3 is referred to as the "primary transcoder", with two other transcoders (not shown) coupled to lines 40 and 42, respectively, being referred to as the first and second "backup transcoders."

The implementation illustrated in FIG. 3 ensures that IDR alignment is built into the design, so that when the transcoder goes through the above steps, the output transcoded video stream will have the PTS aligned at the IDR among all of the profiles from different transcoders ("primary" and "backup") that comply with the teachings of the present invention. As previously indicated, each profile is a separate stream containing the same video information at a different bitrate or "resolution."

Any number of transcoders (e.g., a primary transcoder and a plurality of backup transcoders) can be provided as indicated in FIG. 2. For each transcoder, apparatus as set forth in FIG. 3 can be provided to maintain proper alignment of the various profiles provided by the transcoders. Alignment will be provided not only for all of the profiles of each transcoder, but also between the profiles provided by the different transcoders.

The components of the apparatus illustrated in FIG. 3 can be implemented in hardware, software, firmware or a combination of these. Typically, the system will run on a computer processor that executes firmware to provide the necessary functionality, as well understood by those skilled in the art.

It should now be appreciated that the present invention provides apparatus and methods for streaming video in a plurality of different profiles. A video stream is transcoded to provide the plurality of different profiles. The video stream comprises frames having a PTS which is used as a token to identify particular frames of the video stream to be encoded as Instantaneous Decoder Refresh (IDR) frames in each profile. An IDR frame period indicative of a desired number of video frames between two IDR frames is determined. An IDR frame is inserted into each profile of the video stream every IDR frame period. The IDR frames of each profile are aligned with the same IDR frames of the other profiles in the plurality of different profiles. The PTS of each IDR frame in each profile is monitored. If the monitoring step determines that a PTS is out of alignment, the next PTS of the affected profile is realigned with the corresponding PTS of remaining profiles. Multiple transcoders can each provide the same set of profiles, all being kept in alignment in accordance with the teachings of the present invention.

Although the invention has been described in accordance with a particular example embodiment, those skilled in the art will appreciate that various other embodiments, variations and modifications can be provided using the teachings of the invention, all of which are intended to be included within the scope of the following claims.

What is claimed is:

1. A method for streaming video in a plurality of different profiles, comprising:
transcoding a video stream to provide said plurality of different profiles, said video stream comprising frames having a Presentation Time Stamp (PTS);
using only said PTS as a token to identify a first frame of said video stream to be encoded as an Instantaneous Decoder Refresh (IDR) frame in each profile;
determining an IDR frame period indicative of a desired number of video frames between two IDR frames for each of the profiles;
encoding select subsequent frames in each profile of the video stream as IDR frames, said select subsequent frames occurring at a PTS period corresponding substantially to the IDR frame period for each corresponding profile for every IDR frame period, said encoding resulting in the IDR frames of each profile being aligned with the same IDR frames of each of the other profiles in said plurality of different profiles;
monitoring the PTS of each IDR frame in each profile; and
if said monitoring step determines that a PTS of one of the IDR frames is out of alignment, realigning the next IDR frame of the affected profile with the corresponding IDR frame of remaining profiles.

2. A method in accordance with claim 1, wherein:
a backup transcoder is provided to duplicate the transcoding of said video stream into said profiles; and
said monitoring and realigning steps are applied independently to each of the transcoders processing said video stream to maintain the IDR frames of each of the profiles provided by each of the different transcoders in alignment with each other.

3. A method in accordance with claim 2, wherein:
a plurality of backup transcoders are provided and the profiles provided by each of said plurality of transcoders are maintained in alignment.

4. A method in accordance with claim 1, comprising:
identifying a first frame of said video stream for transcoding;
obtaining the PTS of said first frame;
determining a time stamp threshold for commencing the transcoding process; and
commencing transcoding in accordance with the determined time stamp threshold.

5. A method in accordance with claim 1, wherein:
if an IDR frame is inserted into said video stream based on an external trigger during the transcoding process, the insertion of subsequent IDR frames is adjusted to maintain PTS alignment among the plurality of profiles.

6. Apparatus for streaming video in a plurality of different profiles, comprising:
a primary transcoder apparatus coupled to receive an input video stream and transcode said stream to provide a plurality of different profiles, said video stream comprising frames having a Presentation Time Stamp (PTS), said primary transcoder comprising a processor for implementing:
a video decoder for decoding the input video stream and providing an uncompressed video stream;
a video encoder for receiving the uncompressed video stream to provide the plurality of different profiles;
a PTS detector operatively associated with said video decoder for detecting the PTS in said frames;
an Instantaneous Decoder Refresh (IDR) frame calculator operatively associated with said PTS detector for identifying a first frame of said uncompressed video stream to be encoded as an IDR frame for each of the profiles;

an IDR frame comparator for determining an IDR frame period indicative of a desired number of video frames between two IDR frames for each of the profiles;

an IDR insertion commander responsive to said IDR frame calculator for instructing said video encoder to encode the first frame of each of the profiles as an IDR frame and responsive to said IDR frame comparator for instructing the video encoder to encode subsequent frames of each of the profiles which occur at a PTS period corresponding substantially to the IDR frame period for that profile as IDR frames every IDR frame period;

an IDR PTS detector for obtaining the PTS of IDR frames of each of the profiles encoded by the video encoder; and said IDR frame comparator being responsive to the PTSs obtained by said IDR PTS detector for determining if a profile alignment error exists in one of said IDR frames across each of the profiles;

wherein:

said IDR insertion commander is responsive to said IDR frame comparator for instructing said video encoder to realign the encoding of a following IDR frame of the affected profile in order to correct an alignment error; and only said PTS is used to identify the first frame of said video stream to be encoded as an IDR frame in the uncompressed video stream for each of the profiles.

7. Apparatus in accordance with claim 6, comprising:

a backup transcoder apparatus coupled to receive said input video stream and duplicate the transcoding of said video stream into backup profiles corresponding to the plurality of profiles;

said backup transcoder apparatus comprising a processor being adapted to insert an IDR frame into said backup profiles every IDR frame period, the IDR frames of said backup profiles being aligned with the same IDR frames of the corresponding profiles provided by said primary transcoder apparatus.

8. Apparatus in accordance with claim 7, wherein said backup transcoder apparatus is functionally equivalent to said primary transcoder apparatus.

9. Apparatus in accordance with claim 8, wherein:

a plurality of functionally equivalent backup transcoder apparatuses are provided and the profiles provided by said primary and plurality of backup transcoder apparatuses are maintained in alignment.

10. Apparatus in accordance with claim 7, comprising:

a primary segmenter associated with said primary transcoder apparatus for packaging said plurality of profiles into chunks; and a backup segmenter associated with said backup transcoder apparatus for packaging said backup profiles into chunks.

11. Apparatus in accordance with claim 10, comprising:

at least one server for streaming said chunks to a plurality of clients.

12. Apparatus in accordance with claim 6, wherein the processor further implements:

an on-demand IDR requestor for enabling the insertion of additional IDR frames in response to external triggers;

wherein upon the insertion of one or more additional IDR frames in response to the on-demand IDR requestor, the insertion of subsequent IDR frames is adjusted to maintain PTS alignment among the plurality of profiles.

* * * * *